US008763302B2

(12) United States Patent
Morse et al.

(10) Patent No.: US 8,763,302 B2
(45) Date of Patent: Jul. 1, 2014

(54) HANDLING APPARATUS FOR PLANT GROWTH SUBSTRATES

(76) Inventors: Mark R. Morse, McMinnville, OR (US); Russell L. Morse, McMinnville, OR (US)

(*) Notice: Subject to any disclaimer, the term of this patent is extended or adjusted under 35 U.S.C. 154(b) by 790 days.

(21) Appl. No.: 12/375,204

(22) PCT Filed: Jul. 26, 2007

(86) PCT No.: PCT/US2007/016887
§ 371 (c)(1),
(2), (4) Date: Jan. 26, 2009

(87) PCT Pub. No.: WO2008/013933
PCT Pub. Date: Jan. 31, 2008

(65) Prior Publication Data
US 2010/0006607 A1  Jan. 14, 2010

Related U.S. Application Data

(60) Provisional application No. 60/833,290, filed on Jul. 27, 2006.

(51) Int. Cl.
*A01C 11/00* (2006.01)
*A01C 11/02* (2006.01)
*A01G 9/10* (2006.01)
*A01G 9/08* (2006.01)

(52) U.S. Cl.
CPC . *A01G 9/08* (2013.01); *A01C 11/02* (2013.01); *A01G 9/108* (2013.01); *A01G 9/083* (2013.01); *A01G 9/085* (2013.01)
USPC ........................................ 47/1.01 P; 111/104

(58) Field of Classification Search
USPC ............ 47/1.01 P; 111/104, 105, 114, 95, 96, 111/100–103, 106
See application file for complete search history.

(56) References Cited

U.S. PATENT DOCUMENTS 3,589,319 A    6/1972  Peters
4,156,395 A *  5/1979  Edwards et al. .............. 111/105
(Continued)

FOREIGN PATENT DOCUMENTS

EP    611519 A1 *  8/1994  ............. A01C 11/02
JP    07284305 A *  10/1995  ............. A01C 11/00

OTHER PUBLICATIONS

International Search Report for PCT/US07/16887 (mailed Oct. 3, 2008).

(Continued)

*Primary Examiner* — Son T Nguyen
(74) *Attorney, Agent, or Firm* — Klarquist Sparkman, LLP

(57) ABSTRACT

Described herein are several embodiments of a handling apparatus for plant growth substrates and associated methods of use. For example, in one embodiment, an apparatus for separately and automatically dispensing plant growth media includes a media guide and a media guide regulator. The media guide can define a channel through which media is movable. The media regulator can include a media penetrating member that is positionable within the channel at a first location and a media stopping member that is positionable within the channel at a second location spaced-apart from the first location. The media regulator can be operable to reciprocate between a media penetrating position in which the media penetrating member is positioned within the channel to penetrate media and a media stopping position in which the media stopping member is positioned within the channel to restrict media from movement in at least one direction along the channel.

16 Claims, 12 Drawing Sheets

(56) References Cited

U.S. PATENT DOCUMENTS

| | | | |
|---|---|---|---|
| 4,186,671 A | | 2/1980 | Huang |
| 4,290,373 A | * | 9/1981 | Boots et al. .................. 111/105 |
| 4,307,827 A | * | 12/1981 | Turunen ............................ 225/1 |
| 4,644,880 A | | 2/1987 | Branch |
| 4,934,290 A | | 6/1990 | Benest |
| 5,488,802 A | | 2/1996 | Williames |
| 5,676,072 A | | 10/1997 | Williames |
| 5,765,491 A | | 6/1998 | Brower et al. |
| 5,881,655 A | | 3/1999 | Edmonds et al. |
| 5,911,631 A | | 6/1999 | Bouldin et al. |
| 5,996,513 A | * | 12/1999 | Nanbu et al. .................. 111/105 |
| 2002/0043195 A1 | | 4/2002 | Williames |

OTHER PUBLICATIONS

Written Opinion for PCT/US07/16887 (mailed Oct. 3, 2008).

\* cited by examiner

HANDLING APPARATUS FOR PLANT GROWTH SUBSTRATES

CROSS REFERENCE TO RELATED APPLICATIONS

This is the U.S. National Stage of International Application No. PCT/US2007/016887, filed Jul. 26, 2007, which was published in English under PCT Article 21(2), which in turn claims the benefit of U.S. Provisional Application No. 60/833,290, filed Jul. 27, 2006. Both applications are incorporated herein in their entirety.

FIELD

The present application relates to high-volume production of plant growth substrates, and more particularly, to handling apparatus for manipulating and loading such substrates.

BACKGROUND

In the horticultural industry, purveyors of plant starts are constantly seeking ways to improve the efficiency and productivity of propagation, manufacturing, and distribution techniques. One known method of packaging plant starts is used by Ellegaard A/S of Denmark, and described in U.S. Pat. No. 7,011,778, which is incorporated herein by reference. The method includes encasing plant propagation media, e.g., soil, within a degradable cellulose fabric sleeve with a machine. The combined sleeve and propagation media units, e.g., growth substrate blocks or Ellepots™, are individually manufactured and loaded into respective receptacles formed in a substrate tray. Once loaded into the trays; plant starts, such as seeds, seedlings, and vegetative plants, are planted in the units and the unit-bearing trays are distributed to buyers or growers. The units are then removed from the trays and transplanted by the buyers in desired locations for desired horticultural purposes.

According to some conventional methods, substrates produced by substrate-making machines are manually loaded into substrate trays. These methods typically require multiple workers as substrates can be produced by substrate-making machines at high rates. For example, one known pot-producing machine, the Ellegaard H 101 machine, produces substrates at a rate of about 2.4 substrates per second. Accordingly, several conventional automated machines were devised in an attempt to reduce manually labor and increase efficiency. While providing certain of these advantages, many of these machines lacked versatility and were expensive, bulky, and functionally limited.

Further, in order to improve efficiency, many substrate-making machines, such as the Ellegaard H 101, are configured to produce substrates two at a time. Therefore, the substrate pairs must be separated prior to being loaded into substrate trays. Many conventional automated substrate loaders lack the ability to perform such a separation.

SUMMARY

Described herein are several embodiments of a handling apparatus for plant growth substrates and associated methods of use. For example, in one embodiment, an apparatus for separately and automatically dispensing plant growth media includes a media guide and a media guide regulator. The media guide can define a channel through which media is movable. The media regulator can include a media penetrating member that is positionable within the channel at a first location and a media stopping member that is positionable within the channel at a second location spaced-apart from the first location. The media regulator can be operable to reciprocate between a media penetrating position in which the media penetrating member is positioned within the channel to penetrate media and a media stopping position in which the media stopping member is positioned within the channel to restrict media from movement in at least one direction along the channel.

In some implementations, the apparatus can include a media accelerator with a follower that is positionable within the channel. The media accelerator can be operable to move the follower through the channel. In certain implementations, a single actuator can be coupleable to the media regulator and media accelerator to operate the media regulator and the media accelerator. In specific implementations, the follower can be retractable from and extendable into the channel via engagement with a one-way valved continuous pathway.

In yet some implementations, the apparatus can include a carriage coupled to an actuator. The carriage can be movable along a track via operation of the actuator. The carriage can include a cam follower that is engageable with the regulator to reciprocate the regulator between the media penetrating position and the media stopping position as the carriage moves along the track. The carriage also can include a follower coupling portion that is coupled to the follower to move the follower as the carriage moves along the track.

According to some implementations, the media regulator can include a movable arm that has a first upper portion and a second lower portion. The media penetrating member is coupled to the first upper portion and the media stopping member is coupled to the second lower portion. The movable arm can be pivotable about an axis positioned intermediate the first upper and second lower portions to extend and retract the media penetrating and stopping members, respectively, into and out from the channel.

In specific implementations, when in the media penetrating position, the media stopping member can be retracted from the channel, and when in the media stopping position, the media penetrating member can be retracted from the channel.

In certain examples, media includes a plurality of discrete media articles. Each of the media articles can include degradable-material wrapped soil.

In some implementations, the media penetrating member and the media stopping member can each include at least one needle. In specific implementations, the needle of the media penetrating member can include a substance injector operable to inject a substance into the plant growth media.

In another exemplary embodiment, an apparatus for dispensing plant start substrates into respective receptacles of a tray can include a tray loader, a substrate loader and a substrate accelerator. The tray loader can be operable to position a tray in a substrate receiving position. The substrate loader can be movable relative to the tray and include a substrate channel through which substrates are feedable and an arm that has a substrate piercer and a substrate stopper. The arm is pivotable between a first position and a second position. In the first position, the piercer penetrates the channel to pierce and suspend a substrate positioned within the channel and the stopper is positioned outside of the channel. In the second position, the stopper penetrates the channel to prevent substrate flow through the channel and the piercer is positioned outside of the channel. The substrate accelerator can include a substrate follower that is movable through the channel. When the arm is in the first position, the substrate follower can be engageable with substrates positioned within the channel below the piercer.

In some implementations, the apparatus includes an actuator coupled to the arm and follower. The actuator can be operable to pivot the arm and move the follower. In certain implementations, the arm and follower can be coupled to the actuator via a carriage movable by the actuator along a linear track. In a specific implementation, an outer periphery of the arm defines a cam path having a first linear portion, a second linear portion angled with respect to the first linear portion and a concave portion intermediate the first and second linear portions. The carriage further includes a cam follower that is engageable with the cam path to pivot the arm between the first and second positions.

According to one embodiment, a method for packaging substrate encased plant start media into a packaging element can include positioning a packaging element in a receiving position. The method can also include positioning a media dispenser in a dispensing position. Further, the method includes feeding a first media article through a channel and feeding a second media article through the channel in series with the first media article so that the second media article follows the first media article. The method includes stopping the first media article within the channel with a support member. The support member extends at least partially through the channel such that the first media article comes to rest against the support member and the second media article comes to rest against the first media article. The method also includes retracting the support member from the channel to release the first media article for continued feeding and substantially stopping feeding of the second media article by extending a media piercing member into the channel to contact the second media article. With the packaging element in the receiving position and the media dispenser in the dispensing position, the method includes dispensing the first media into the packaging element.

In some implementations, after retracting the support member to release the first media article, the method can include retracting the piercing member from the second media article and extending the support member into the channel such that the second media article comes to rest against and is stopped by the support member. In some implementations, after releasing the first media article, the method can include driving a follower through the channel to engage and facilitate dispensing of the first media article. In yet some implementations, after dispensing the first media article into the packaging element, the method can include moving the dispenser relative to the packaging element from the dispensing position to a new dispensing position.

In specific implementations, the packaging element is a tray that includes a plurality of receptacles and positioning the tray includes engaging the receptacles with alignment elements. Retracting the support member from the channel, extending a media piercing member into the channel, and driving the follower can include actuating only one actuator.

In certain implementations, retracting the support member from the channel and extending a media piercing member into the channel occurs substantially simultaneously.

The foregoing and other features and advantages of the handling apparatus will become more apparent from the following detailed description, which proceeds with reference to the accompanying figures.

DETAILED DESCRIPTION

This disclosure is set forth in the context of representative embodiments that are not intended to be limiting in any way.

In the following description, certain terms may be used such as "up," "down," "upper," "lower," "horizontal," "vertical," "left," "right," "clockwise," counterclockwise," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1A:
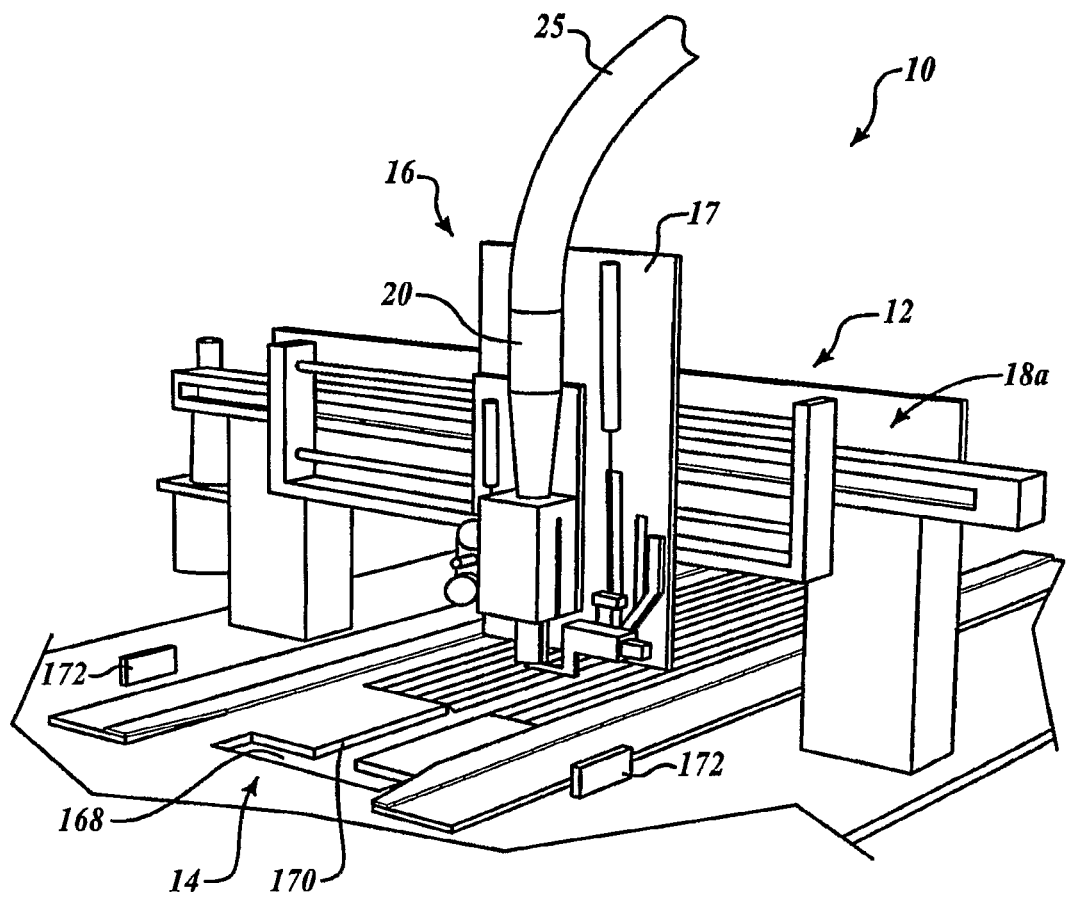
FIG. 1A is a perspective view of a handling apparatus according to one embodiment having a first pot positioner.
Figure 2:
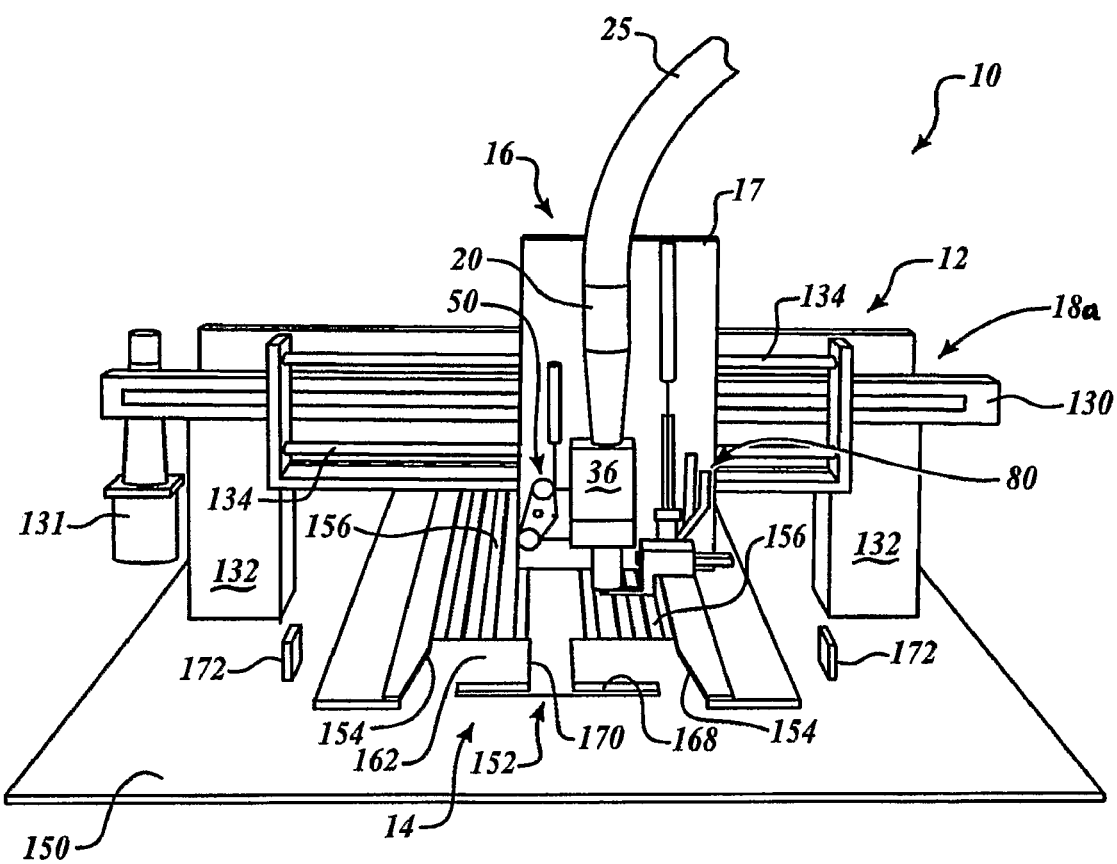
FIG. 2 is a front perspective view of the handling apparatus of FIG. 1.

Referring to FIGS. 1A and 2, a handling apparatus 10 includes a pot loading portion 12 and tray loading portion 14. Generally, the pot loading portion 12 receives pots from a pot producing machine, such as described above, and is in an operative relationship with the tray loading portion 14 to deliver pots to a pot tray 15 (see FIG. 3). In other words, the pot loading portion 12 and tray loading portion 14 work in conjunction with each other to quickly and conveniently package pots in pot trays.

Figure 4:
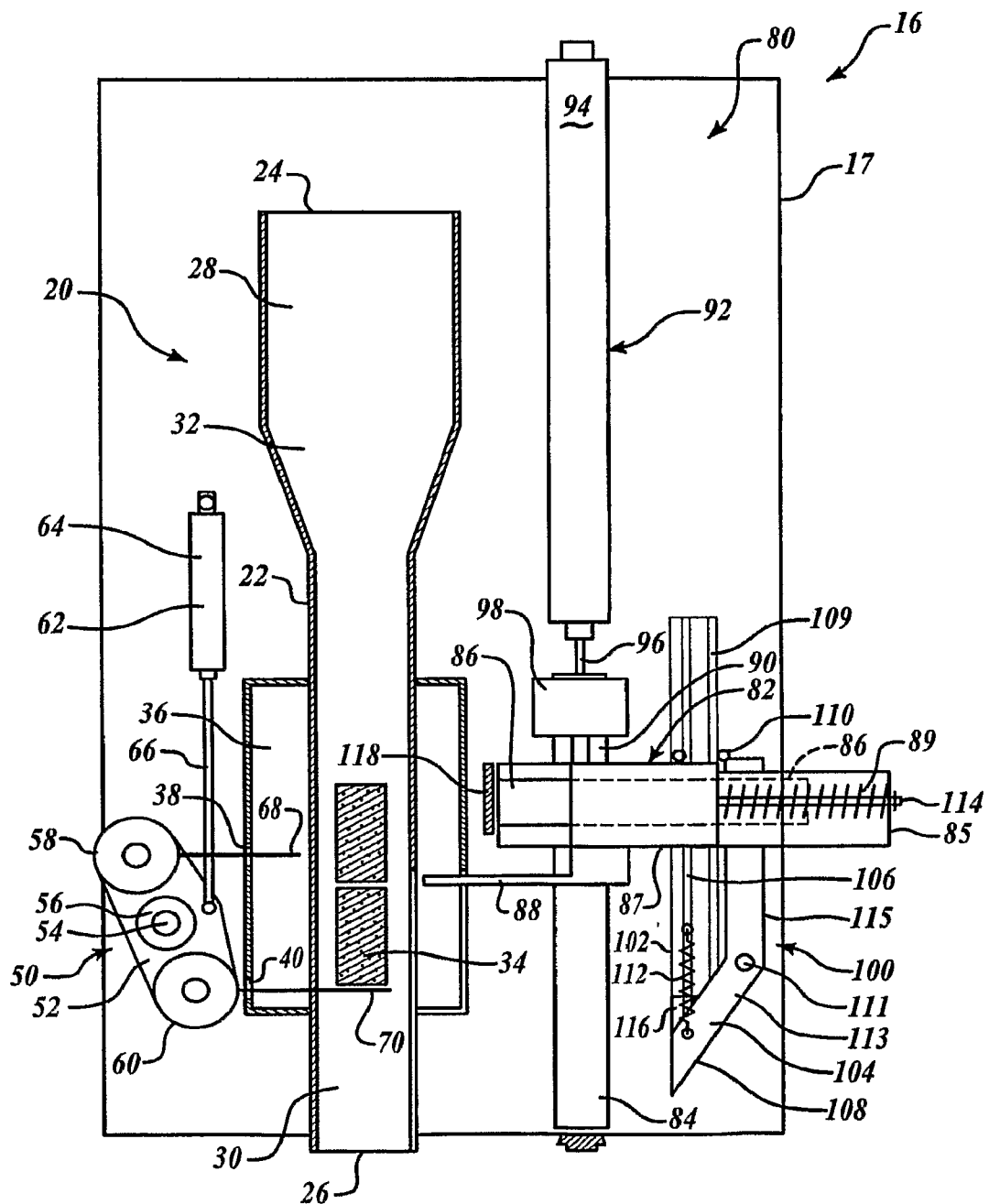
FIG. 4 is a front elevation view of a dispenser of the handling apparatus of FIG. 1 shown with the regulator in a pot stopping position and a follower in a raised position.

The pot loading portion 12 includes a pot dispenser 16 movably coupled to a pot positioner 18a. The dispenser 16 includes a base 17 and a pot guide 20 coupled to the base 17. Referring now to FIG. 4, the pot guide 20 defines a channel 22 that extends downwardly from an upper end 24 to a lower end 26. In certain implementations, such as shown, the channel 22 includes an upper section 28 extending downwardly from the upper end 24 and a lower section 30 extending upwardly from the lower end 26. The upper section 28 has a first cross-sectional area and the lower section 30 has a second cross-sectional area smaller than the first cross-sectional area. The upper section 28 is coupled to the lower section 30 by a tapered section 32 having gradually decreasing cross-sectional areas extending from the upper section to the lower section.

Figure 5:
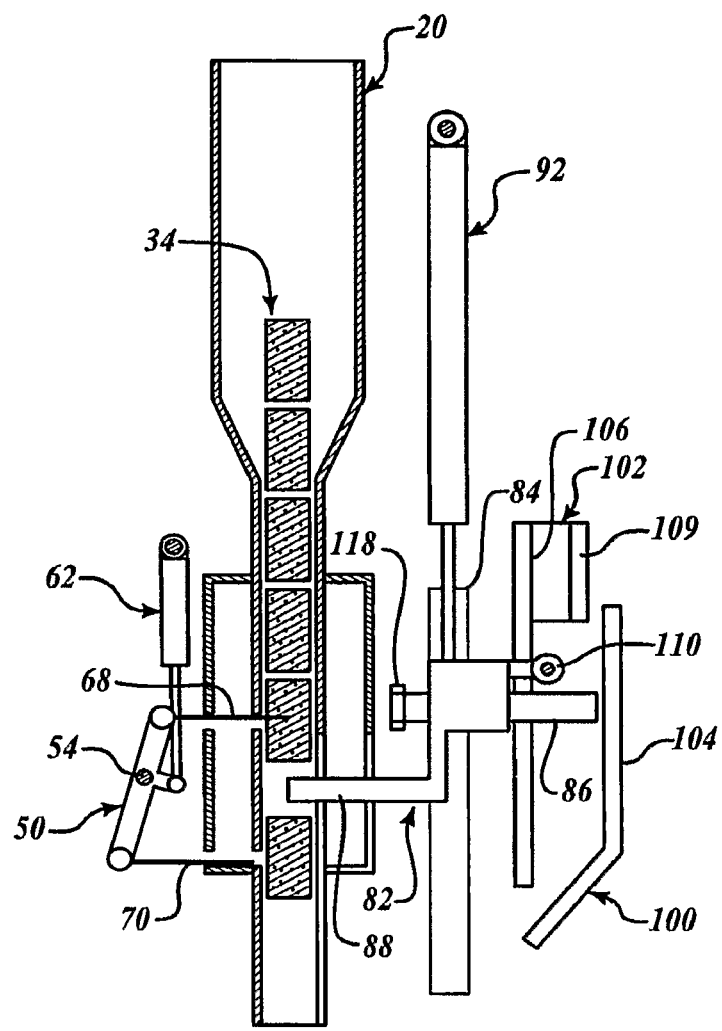
FIG. 5 is a schematic front elevation view of the dispenser of the handling apparatus of FIG. 1 shown with a regulator in an intermediate position and the follower in an intermediate position.
Figure 6:
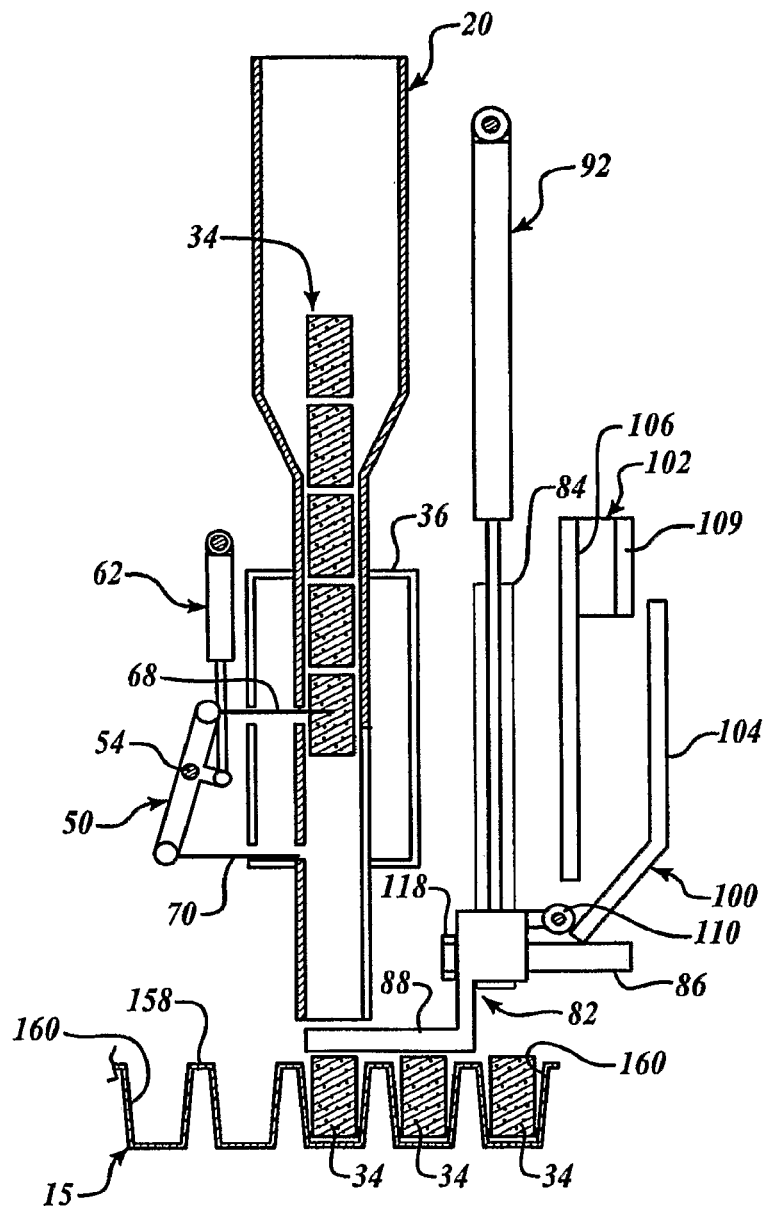
FIG. 6 is a schematic front elevation view of the dispenser of the handling apparatus of FIG. 1 shown with the regulator in a pot penetrating position and the follower in a lowered position.

The upper end 24 is in pot receiving communication with a supply of pots, such as pots 34 (see FIGS. 5 and 6). As defined herein, a pot includes any discrete article shaped to receive a plant propagation material and the material received by the article. Preferably, the article includes a penetrable or permeable substrate or sleeve, such as, but not limited to, cellulose substrates, surrounding and laterally containing the plant propagation material, which is preferably a soilless media or any suitable growing media (see, e.g., Ellepots™). For exemplary purposes only, soilless media can include, but is not limited to, solely or mixtures of peat, bark, sawdust, pumice, sand, ponga, sphagnum, rockwool, cocofiber, expanded clay, foam, rubber, fiberglass, paper, cloth, and various suitably pourus, fiberous media. In certain implementations, the supply of pots is generated by pot-producing machine (not shown), such as the H101 and H201 machines manufactured by Ellegaard™. The output of the machine is coupled to the upper end 24 of the channel 22 by a conduit, such as flexible hose 25. The conduit extends downwardly from the output of the machine to the upper end 24 such that gravity urges the pots 24 from the output of the machine to the upper end of the channel along the conduit.

The guide 20 includes a housing 36 intermediate the tapered section 32 and the lower end 30. The housing 36 substantially surrounds the channel 22 and includes a first upper aperture 38, second lower aperture 40 and slot 42 (see FIG. 3) each extending from an outer surface of the housing to the channel 22. In the illustrated embodiment, the first upper aperture 38 is substantially vertically aligned with the second lower aperture 40 and the slot 42 extends in a substantially vertical direction.

The pot dispenser 16 further includes a pot regulator 50 rotatably coupled to the base 17. The regulator 50 includes an arm 52 that is rotatable about a pivot point, or fulcrum, 54 defined by a regulator arm mount 56 that couples the arm to the base 17. The mount 56 is coupled to the arm 52 at a location intermediate first upper and second lower ends 58, 60 of the arm. The regulator 50 further includes an actuator 62 having a fixed portion 64 mounted to the base 17 and a movable portion 66 coupled to the arm 52 at a location intermediate the first and second ends 58, 60. An actuator, such as actuator 62, can be any of various conventional actuators, such as solenoids, pneumatic, hydraulic or electromagnetic cylinders, track actuators, and/or stepper motor or servomotor and track combinations, that is operable to extend a movable portion, such as movable portion 66, away from a fixed portion, such as fixed portion 64, and retract the movable portion toward the fixed portion. Movement of the fixed portion 64 urges the first upper and second lower ends 58, 60 of the arm 52 to rotate about the pivot point 54 and move away from or towards the pot guide 20.

For example, in the exemplary embodiment shown in FIG. 4, the movable portion 66 is coupled to the arm 52 at a location intermediate the pivot point 54 and the guide 20. As the movable portion 66 is retracted, the first upper end 58 of the arm 52 moves away from the guide 20 and the second lower end 60 of the arm moves toward the guide 20. Similarly, as the movable portion 66 is extended, the first upper end 58 of the arm 52 moves toward the guide 20 and the second lower end 60 of the arm moves away from the guide 20.

The pot regulator 50 further includes a pot suspension member 68 coupled to the first upper end 58 of the arm 52 and a pot stop member 70 coupled to the second lower end 60 of the arm. The pot suspension member 68 extends from the first upper end 58 into the first upper aperture 38 of the housing 36 and the pot stop member 70 extend from the second lower end 60 into the second lower aperture 40 of the housing. The actuator 62 is operable to rotate the arm between a pot penetrating position and a pot stopping position. As shown in FIGS. 4 and 5, in the pot stopping position, the second lower end 60 of the arm 52 is closer to the guide 20 than the first upper end 58 and the pot stop member 70 extends through the lower aperture 40 and penetrates the channel 22. The pot suspension member 68 is correspondingly positioned away from the guide 20 and does not penetrate the channel 22. As shown in FIG. 6, in the pot penetrating position, the first upper end 58 of the arm 52 is closer to the guide 20 than the second lower end 60 and the pot suspension member 68 extends through the upper aperture 38 and penetrates the channel 22. The pot stop member 70 is correspondingly positioned away from the guide 20 and does not penetrate the channel 22.

In specific implementations, the pot suspension and stop members 68, 70 are needles having a diameter between approximately 0.3 mm and approximately 1 mm. However, depending on the configuration and material of the pots, in other implementations, the pot suspension and stop members 68, 70 can be any sized needle or other implement appropriate for penetrating or applying a pressure to the pots, as will be described in more detail below. Further, although in the illustrated embodiments, the regulator 50 includes a single pot suspension member 68 and a single pot stop member 70, in certain implementations, the regulator 50 can include two or more pot suspension members 68 and/or two or more pot stop members 70. For example, in some implementations, the pots 34 can be relatively large, such as having diameters of 120 mm or more, and multiple pot suspension and pot stop members 68, 70 may be necessary to respectively suspend and stop the pots.

In the horticultural industry, it is often desirable to apply a treatment, such as a fungicide, fertilizer, insecticide, seed, or any other useful products, to the plant propagation media of the substrate or pot. Because the pot suspension member 68 penetrates each pot, in certain implementations, the pot suspension member can be a hypodermic-type needle coupled to a reservoir containing a treatment and metering device. When the pot suspension member 68 penetrates the pot to suspend it within the channel 22, the substrate media can be injected with the desired treatment.

Although in the illustrated embodiments, the pot suspension member 68 and pot stop member 70 are mechanically linked via the arm 52, in some embodiments, the pot suspension and stop members are not mechanically linked. For example, in some embodiments, the regulator 50 can include one actuator for extending and retracting the pot suspension member and another separate and independently operable actuator for extending and retracting the pot stop member.

Referring to FIG. 4, the pot dispenser 16 further includes a pot follower assembly, or accelerator, 80 coupled to the base 17. The follower assembly 80 includes a follower 82 that is movable relative to the guide 20 along vertical and horizontal tracks 84, 86. The follower 82 includes a horizontal sliding block 87 in sliding engagement with the horizontal track 86 mounted to a base plate 85. The follower 82 also includes a pot engaging member 88 extending outwardly from the sliding block 87 toward the guide 20. The follower 82 is horizontally biased toward the guide 20 by a biasing member, such as spring 89, positioned intermediate the horizontal sliding block 87 and a stop 114 coupled to the horizontal track 86. The horizontal track 86 is coupled to a vertical sliding block 90 in sliding engagement with the vertical track 84. The vertical track 84 is fixedly mounted to the base 17.

The pot follower assembly 80 further includes an actuator, such as linear actuator 92 mounted to the base 17. The linear actuator 92 includes a fixed portion 94 fixed relative to the guide 20 and a movable portion 96 movable relative to the guide. The movable portion 96 is coupled to the vertical sliding block 90 via a connector bracket 98. The linear actuator 92 is operable to extend and retract the movable portion 96 to move the vertical sliding block 90, and thus the horizontal track 86 and follower 82, vertically downwards and upwards, respectively.

As the vertical sliding block 90 and follower 82 move in a vertical direction, a follower retractor assembly 100 coupled to the base 17 causes the follower 82 to correspondingly move in a horizontal direction. The follower retractor assembly 100 includes a stationary member 102 and a movable member 104 having respective elongate ridges 106, 108 with outer surfaces defining a cam track. The stationary member 102 also includes a cam follower sear 109 positioned intermediate the ridges 106, 108 and above ridge 106. The movable member 104 is coupled to and pivotable about a pin 111, or pivot point, coupled to the base 17. Further, the movable member 104 is biased in a first rotational direction about the pin by a biasing element, such as spring 112, and limited to a predetermined degree of rotation in the first rotational direction by stop 116. The follower 82 includes a cam follower 110, such as a roller bearing, coupled to the horizontal sliding block 87 and positioned intermediate the sliding block and the base 17. The ridges 106, 108 extend away from the base 17 and have a height sufficient to engage the cam follower 110.

Generally, the pot follower assembly 80 is operable to engage one or more pots 34 queued in the guide 20, accelerate the engaged pots toward the lower end 26 of the channel 22 and eject the engaged pot or pots from the guide. More specifically, the pot follower assembly 80 is operable to move the follower 82 between a raised position (see FIGS. 4 and 5) and a lowered position (see FIG. 6). In the raised position, the movable portion 96 of the actuator 92 is in a fully retracted position, the cam follower 110 is biased against the sear 109 of the stationary member 102 by the spring 89, and the pot engaging member 88 extends through the slot 42 of the housing 36, but does not penetrate the channel 22.

The actuator is operated to extend the movable portion 96 and cause the follower 82 to move vertically downward. As the follower 82 moves downward from the raised position, the cam follower 100 rolls along and remains engaged with the sear 109 to maintain the pot engaging member in a constant horizontal position. Once the cam follower 100 rolls beyond the sear, the follower 82 is urged toward the guide 20 by the spring 112 until the cam follower 110 engages the ridge 106 to place the follower 82 in a pot engaging position (see FIG. 6). In the pot engaging position, the pot engaging member 88 penetrates the channel 22. In some instances, the pot engaging member 88 extends through greater than half the width of the channel 22 when in the pot engaging position. In other instances, the pot engaging member 88 can extend through the channel 22 any distance that is suitable for the particular type of pots being handled.

As the movable portion 96 of actuator 92 is further extended, the follower 82 is moved vertically downward and the cam follower 110 rolls along the ridge 106 to maintain the follower 82 in a constant horizontal position. The follower 82 remains engaged with the ridge 106 until the ridge terminates, at which point, the spring 112 urges the follower 82 toward the guide 20 until it engages a follower stop 118 to insert the pot engaging member 88 even further into the channel 22. Further extension of the movable portion 96 moves the follower 82 vertically downward until the cam follower 110 engages an inner surface of the ridge 108 of movable member 104. The follower 82 continues to move downward to cause the movable member 104 to rotate about its pivot point (e.g., counterclockwise as shown in FIG. 6). The cam follower 110 rolls along the inner surface of the ridge until it clears the lower end of the ridge 108 and the movable member 104 returns (e.g., rotates clockwise about its pivot point) to its original position via the biasing effect of the spring 112 and the stop 116. In this position, i.e., pot ejecting position, the lower end of the ridge 108 is closer to the guide 20 than the cam follower 110 and pot engaging member 88 is at or near the lower end 26 of the channel 22.

In some implementations, the pot follower assembly 80 is operable to extend the pot engaging member 88 into the channel 22 between approximately 35 milliseconds and approximately 50 milliseconds after the pot stop member 70 is retracted from the channel. Such a delay can allow the released pot 34 to fall between approximately 5 millimeters and approximately 10 millimeters before the pot follower assembly 80 contacts and accelerates the pot the remaining length of the channel 22.

From the pot ejecting position, the follower 82 is moved vertically upward until the cam follower 110 engages the outward surface of the ridge 108. The cam follower 110 rolls along and remains engaged with the outward surface of the ridge 108 as the follower 82 is moved vertically upward. The ridge 108 includes an angled portion 113 and a vertical portion 115. The angled portion 113 extends from its lower end upwardly and outwardly away from the guide 20 at an angle and the vertical portion extends substantially parallel to the guide 20 when the movable member 104 is in its original position (see FIG. 4). As the cam follower 110 rolls upwardly along the angled portion, the follower 82 moves vertically upward and horizontally away from the guide to retract the pot engaging member 88 from the channel 22. From the angled portion, the cam follower 110 moves upwardly along the vertical portion. As the cam follower 110 moves vertically beyond the pivot point of the movable member 104, the cam follower causes the movable member to overcome the biasing force of the spring 112 and rotate (e.g., counterclockwise as viewed in FIG. 4). The cam follower 110 moves vertically beyond the upper end of the ridge 108 until the cam follower engages the sear 110 to place the follower 82 in the raised position. From this position, the actuator 92 can be operated to again move the follower 82 through the above-described cycle between the raised position and the pot ejecting position.

The pot follower assembly 80 is highly versatile compared to conventional handling systems. For example, the pot follower assembly 80 can engage pots of any of various sizes or shapes, accelerate the pots, and eject the pots into trays having any of various sizes or configurations without significant modifications or alterations of the assembly. In other words, the pot follower assembly 80 is not limited to engaging, accelerating and ejecting one specifically sized and shaped pot into one specifically sized and configured tray as with some conventional handling systems.

In operation, pots 34 are manufactured by a pot-making machine and feed into the guide 20 in an end-to-end configuration via a flexible tube 25 extending between the machine and the guide 20. The pots 34 are gravity fed vertically downward from the tube. In each iterative pot-dispensing cycle, the arm 52 is first positioned in the pot stopping position such that the pot stop member 70 prevents a pot to be dispensed, e.g., a lowermost pot within the channel 22, from further downward movement (see FIG. 4). The arm 52 is moved from the pot stopping position to the pot penetrating position by operation of the actuator 62 to simultaneously retract the pot stop member 70 from the channel 22 and extend the pot suspension member 68 into the channel 22 (see FIG. 6). As used herein, simultaneously can mean occurring at exactly the same time or nearly the same time, such as including a nominal delay. The pot suspension member 68 is vertically spaced-apart from the pot stop member 70 a predetermined distance such as the pot suspension member 68 contacts, e.g., penetrates, the substrate of the next vertically adjacent pot to prevent that pot from substantial downward movement. In some embodiments where penetration or injection is not necessary or desired, such as, for exemplary purposes only, when handling apparatus 10 is used for handling media other than pots or when the pots are relatively robust, the pot suspension member 68 can press up against the substrate without penetrating it to prevent the media or pot from substantial downward movement.

With the pot stop member 70 removed from the channel 22, the pot to be dispensed is allowed to freely fall in the downward direction and out of the channel 22 via the lower end 26 (see FIG. 5). In this manner, any multiple pots, such as paired pots, manufactured together are separated from each other. Alternatively, although not shown, the plant start media can be feed into the pot dispenser 16 in a continuous, rope-like, strip and the pot dispenser 16 can include a cutter for cutting, severing, pulling-apart, or otherwise separating the strip into individual pots.

The arm 52 is then rotated from the pot penetrating position to the pot stopping position to remove the pot suspension member 68 out of engagement with the suspended pot 34 and extend the pot stop member into the channel 22. The suspended pot 34 then freely falls downwardly through the channel 22 and rests on the pot stop member to begin the next cycle. In this manner, pots 34 are received in series in an end-to-end configuration in the guide and separately and individually dispensed from the guide 20 as the regulator reciprocates between the pot stopping position and the pot suspension position.

In certain instances, it may be beneficial to facilitate or accelerate the downward movement of a pot to be dispensed after retraction of the pot stop member 70 for any of various reasons. For example, the pot may unintentionally contact the sides of the channel 22, which can hamper downward movement of the channel. Or, the channel 22 proximate the lower end 26 can be sized to tightly receive and intentionally contact a pot for high accuracy dispensing of pots into tight trays. Similarly, to expedite production, a user may want to dispense the pots at a higher rate. Alternatively, a force greater than that of gravity may be required to properly install a pot in a tray, such as for relatively large pots, e.g., pots having a diameter of greater than approximately 45 mm. Accordingly, the pot follower assembly can be operated to provide such benefits.

In operation, an iterative cycle begins with the follower in the raised position (see FIG. 4). As the arm 52 transitions from the pot stopping position to the pot penetrating position, the actuator 92 moves the follower out of engagement with the sear 109 to move the pot engaging member 88 within the channel 22 above the pot to be dispensed (see FIG. 5). The actuator 92 moves the follower 82 vertically downward at a predetermined rate that overcomes the acceleration caused by gravity to engage and forcibly accelerate the pot downward through the channel. The pot is accelerated until the follower reaches the pot ejecting position at which time the pot is ejected from the lower end 26 of the channel 22 (see FIG. 6). The follower 82 is then raised, retracted out of the channel 22 and positioned back into the raised position in preparation for accelerating the next vertically adjacent pot.

Prior to a pot being dispensed from the pot dispenser 16, the dispenser can be positioned into a predetermined position relative to a tray located under the dispenser as will be described in more detail below. Referring to FIGS. 1A and 2, the pot positioner 18a is operable to position the dispenser 16 at any of infinite locations along a first horizontal axis, e.g., x-axis, extending generally perpendicularly relative to the guide 20. The pot positioner 16 includes a track actuator 130 with a slider block (not shown) that is linearly movable along a central axis of the actuator by an electric motor, such as motor 131. The slider block is coupled to the base 17 such that the actuator 130 is operable to move the dispenser 16 linearly along the central axis. The actuator 130 is mounted to and spaced-apart from a tray table 150 of the tray loading portion 14 via spacer elements 132. The actuator 130 is mounted such that its central axis extends parallel to the first horizontal axis.

The pot positioner 18a can further include guide rails 134 fixed relative to the actuator 130. In certain implementations, the guide rails 134 are mounted to the actuator 130. The guide rails 134 engage guide followers (not shown) mounted to the base 17. The guide rails 134 and guide followers provide stability and vibrational damping characteristics for the pot dispenser as it moves along the actuator 130.

The tray loading portion 14 conveys and positions trays along a second horizontal axis, e.g., y-axis, perpendicular to the first horizontal axis. Generally, the pot loading portion 12 and tray loading portion 14 are cooperatively controlled to position the pot guide 20 relative to a tray at predetermined locations within an x-y coordinate system defined by the x-axis and y-axis.

Figure 3:
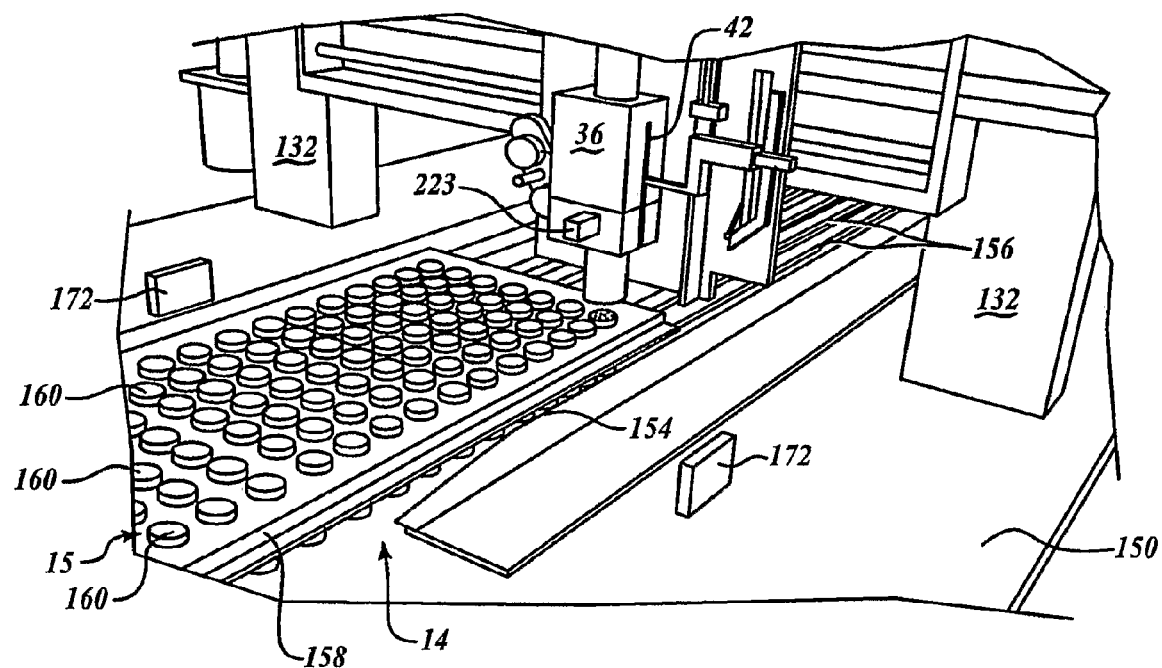
FIG. 3 is a detailed perspective view of the handling apparatus of FIG. 1 shown with a tray.

Referring to FIG. 2, the tray loading portion 14 includes the tray table 150 having a tray conveying portion 152 along which trays are moved. The conveying portion 152 includes outer guides 154 and inner guides 156 for maintaining the trays in a constant horizontal position relative to the x-axis. As shown in FIG. 3, each tray 15 includes a front panel 158, including a side lip, from which a plurality of pot-receiving receptacles extends. As shown in FIG. 3, the rows extend parallel to the x-axis and the columns extend parallel to the y-axis. Multiple trays can be formed from a single mold such that the location of the receptacles 160 relative to each other generally does not vary from tray to tray. However, due to the method of separating the trays from each other after the molding process, the shape of the outer periphery of the front panel 158 can vary. Tray positioning errors can occur with conventional apparatus that rely on guides that contact the outer periphery of the front panel 158 to position the trays. To reduce such errors, the outer and inner guides 154, 156 are configured to contact the receptacles 160, rather than the front panel 158. In this manner, the trays can be more accurately and reliably positioned.

The tray conveying portion 152 includes a tray pathway 162 defined between the outer guides 154. The inner guides 156 extend parallel to the y-axis and are spaced apart along the x-axis between the outer guides 154. The outer guides 154 are vertically upwardly spaced apart from the inner guides 156. The outer guides 154 contact upper portions of the receptacles of the outermost receptacle columns. The inner guides 156 are spaced relative to the outer guides 154 and each other to define receptacle receiving spaces between the guides 154, 156. The lower portions of the receptacles of respective receptacle columns are positioned, e.g., seated, within the spaces between and engage the respective guides 154, 156. Because the lower portions of the receptacles can be rounded, the inner guides 156 can be wedge-shaped with an apex facing upwards to accommodate rounded surfaces.

Figure 7:
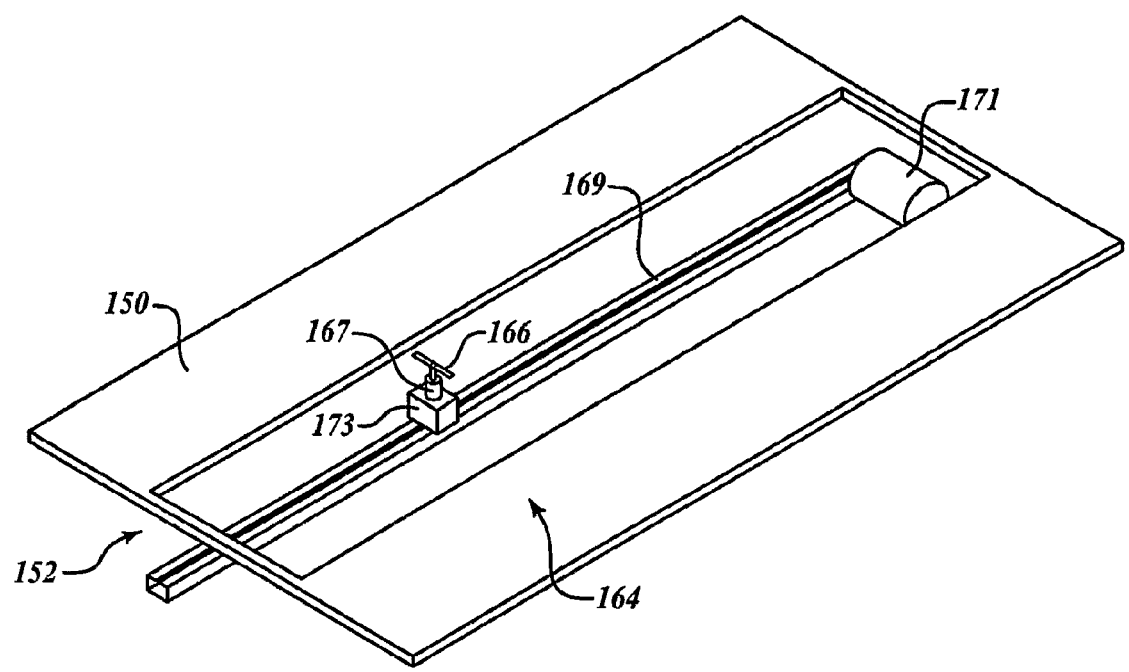
FIG. 7 is a perspective view of a tray loading portion of the handling apparatus of FIG. 1.

Referring to FIG. 7, the tray conveying portion 152 includes a tray engaging assembly 164 positionable beneath the table 150. The tray engaging assembly 164 is configured to at least partially engage the leading row of receptacles and move the tray along the tray pathway 162. As shown, the engaging assembly 164 includes a cylindrical-shaped engager 166 to promote self-centering between two rows of receptacles, e.g., the leading row and adjacent row of receptacles, of a tray. In other implementations, the engager 166 can have any of various shapes to accommodate trays having different receptacles shapes or configurations. The engager 166 is coupled to a first vertically-oriented actuator 167, which is coupled to a second horizontally-oriented actuator 169. The first vertically-oriented actuator 167 is operable to vertically extend and retract the engager 166 and the second horizontally-oriented actuator 169, which includes a motor 171 and a slider block 173, is operable to move the first vertically-oriented actuator and engager horizontally along the y-axis.

The tray conveying portion 152 includes an engager slot 168 and engager pathway 170 formed beneath the tray pathway 162. The engager slot 168 is positioned proximate an upstream end of the tray pathway 162 and sized to allow the engager 166 to extend through the slot. The engager pathway 170 extends downstream from the slot 168 and can be defined between adjacent inner guides 156.

In operation, a tray, such as tray 15, is conveyed or placed into a loading position. A tray is in the loading position when in the tray pathway 162 and the space intermediate the leading row of receptacles and adjacent row of receptacles is positioned approximately above the slot 168. The tray conveying portion 152 can include sensors 172 positioned on opposite sides of the tray pathway 162 to sense when a tray is in the loading position. The vertically-oriented actuator 167 is activated to extend the engager 166 through the slot 168 and within the space intermediate the leading row of receptacles and adjacent row of receptacles. The horizontally-oriented actuator 169 is then activated to move the engager 166, and thus the tray, toward the pot guide 20 in a direction parallel to the y-axis. The horizontally-oriented actuator 169 is controlled to move the tray into a y-axis pot delivering position, i.e., a position relative to the y-axis in which the lower end 26 of the channel 22 is substantially vertically aligned with a row of receptacles of the tray. For example, the tray can be moved into a first y-axis pot delivering position in which the lower end 26 is substantially vertically aligned with the leading row of receptacles.

Before, after or concurrently with movement of the tray into a y-axis pot delivering position, the actuator 130 can be activated to move the pot dispenser 16 into an x-axis pot delivering position, i.e., a position relative to the x-axis in which the lower end 26 of the channel 22 is substantially vertically aligned with a column of receptacles of the tray. For example, the pot dispenser 16 can be moved into a first x-axis pot delivering position in which the lower end 26 is substantially vertically aligned with a first side column of receptacles.

With the lower end 26 of the channel 22 being substantially aligned with a row and column of receptacles, the lower end is substantially aligned with a single receptacle. The pot dispenser 16 is then activated to dispense a pot 34, as described above, into the aligned receptacle. Depending on the location of the just-filled receptacle or whether receptacles in the same row or column require filling, the tray conveying portion 152 or the pot positioner 18a can be operable to move the pot dispenser 16 or tray, respectively, to align the lower end 26 of channel 22 with another receptacle. For example, the actuator 130 can be activated to move the pot dispenser 16 a predetermined distance along the x-axis to fill an adjacent receptacle in the same row with a pot. Alternatively, the horizontally-oriented actuator of the tray engaging assembly 164 can be activated to move the tray a predetermined distance along the y-axis to fill an adjacent receptacle in the same column with a pot. Additionally, in separate or concurrent movements, both the actuator 130 and horizontally-oriented actuator can be activated to fill a receptacle in a different row and column with a pot.

Once a tray is filled with a desired number of pots 34, the tray is moved out from below the lower end 26 of the channel 22 to a tray removal position by moving the engager 166 downstream away from the pot dispenser 16. When the tray is in the tray removal position, the vertically-oriented actuator is activated to lower the engager 166 out of engagement with the tray and the horizontally-oriented actuator is activated to move the engager upstream to a position substantially under the slot 168 in preparation for engaging another tray.

Figure 1B:
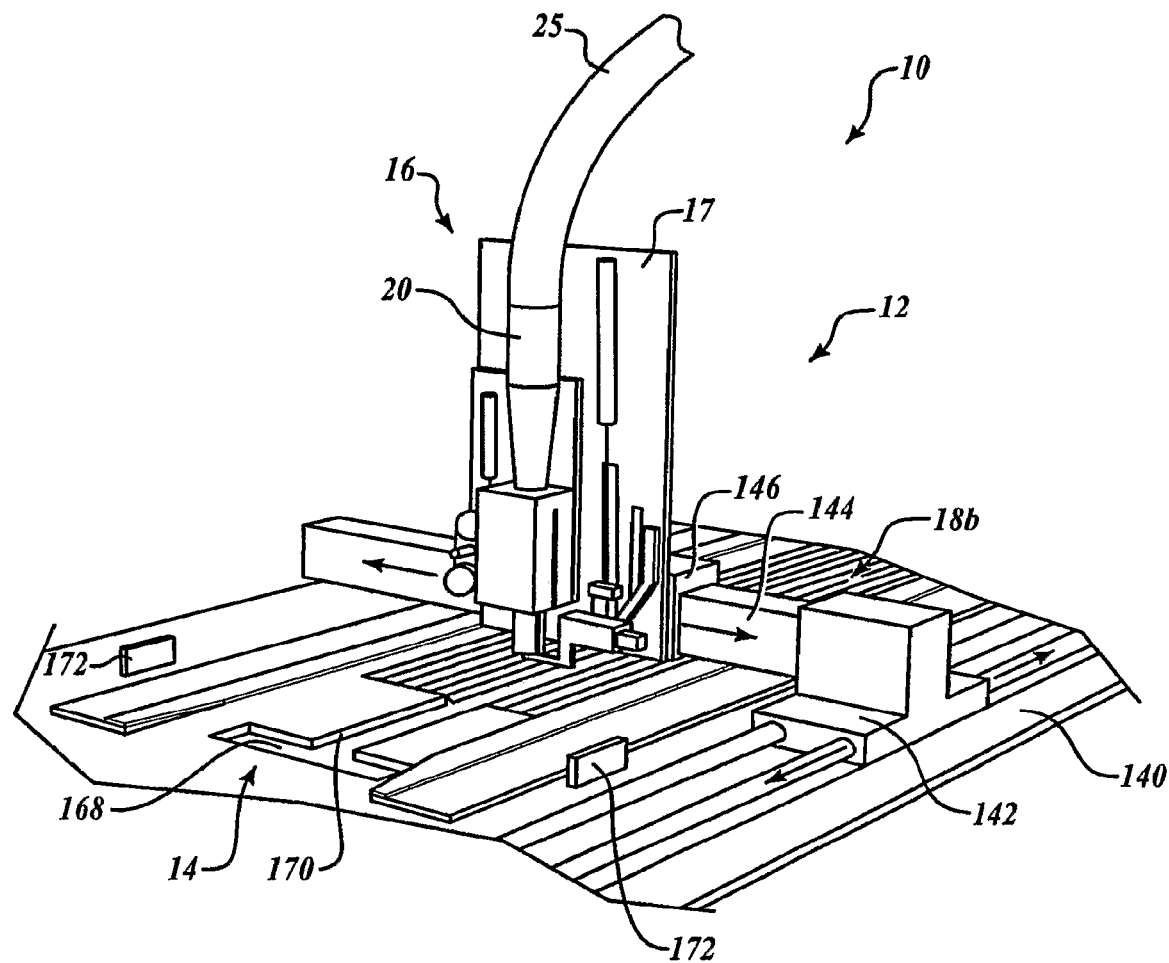
FIG. 1B is a perspective view of a handling apparatus according to another embodiment having a second pot positioner.

In certain embodiments, as shown in FIG. 1B, the handling apparatus 10 can include a pot positioner 18b, such as, for example, a Cartesian robot, operable to position the dispenser 16 at any of infinite locations along the x-axis and the y-axis while the tray remains relatively stationary. The pot positioner 18b includes a first linear track 140 extending parallel to the y-axis and a first guide 142 coupled to and movable along the first linear track via an actuator. A second linear track 144 is coupled to the first guide 142 and extends generally perpendicularly from the first linear track 140. As the first guide 142 moves along the first linear track 140, the second linear track 144 moves relative to the first linear track 140 along the y-axis as shown. The pot positioner 18b further includes a second guide 146 coupled to and movable along the second linear track 144 via an actuator. The base 17 of the pot dispenser 16 is mounted to the second guide 146. As the second guide 146 moves along the second linear track 144, the dispenser 16 moves relative to the second linear track along the x-axis.

In operation, a tray is conveyed or placed into a pot receiving position by operation of the tray loading portion. Before, after or concurrently with movement of the tray into the pot receiving position, the first guide 142 is moved along the track 140 to move the pot dispenser 16 into a desired y-axis pot delivering position and the second guide 146 is moved along the track 144 to move the pot dispenser into a desired x-axis pot delivering position. With the lower end 26 of the channel 22 being in a desired x-axis and y-axis pot delivering position, the pot dispenser 16 is then activated to dispense a pot 34 into the tray receptacle below the lower end. Depending on the location of the just-filled receptacle or whether receptacles in the same row or column require filling, the tray conveying portion 152 or the pot positioner 18a can be operable to move the pot dispenser 16 along the x-axis, y-axis or both to align the lower end 26 of channel 22 with another receptacle.

Referring now to FIGS. 8-11, a pot dispenser 216 according to another embodiment is shown. The pot dispenser 216 can be used in conjunction with a tray loading portion, such as tray loading portion 14, and a pot positioner, such as pot positioner 18a, to position trays and the dispenser 216 for dispensing pots in the tray receptacles. The pot dispenser 216 shares the same general features and characteristics of pot dispenser 16. For example, the pot dispenser 216 includes a pot guide 220, regulator 250 and pot follower assembly 280. However, the pot dispenser 216 includes at least several differences as noted below.

The operation of the regulator 250 and pot follower assembly 280 are controlled by a single actuator 262 as opposed to two actuators each controlling a respective one of the regulator and pot follower assembly as with pot dispenser 16. The actuator 262 includes a fixed portion 264 mounted to a base 217 (see FIGS. 8 and 10) and a movable portion 266 coupled to a linear track 272 via a carriage 274. The carriage 274 includes a regulator cam follower portion 276 and a pot follower driving portion 277. The pot follower driving portion 277 includes a regulator cam follower 278 and the regulator cam follower portion 276 includes a follower mount 279. The carriage 274 is movably engaged with the linear track 272 and moves downward along the track when the movable portion 266 is extended from the fixed portion 264 and upward along the track when the movable portion 266 is retracted toward the fixed portion.

Like the regulator 50 of handling apparatus 10, the regulator 250 includes an arm 252, fulcrum 254 and arm mount 256. The arm 252 includes a first upper end 258 and a second lower end 260. A pot suspension member 268 is coupled to the first upper end 258 and a pot stop member 270 is coupled to the second lower end 260. The arm 252 further includes a regulator cam follower track 253 defined by a back surface of the arm facing away from the guide 20. The regulator cam follower track 253 includes an upper linear portion 255, a lower linear portion 257 angled with respect to the upper linear portion and a concave, or curved, portion 259 intermediate the upper and lower linear portions. The arm 252 is positioned relative to the carriage 274 such that the cam follower 279 engages the cam follower track 253 as the carriage moves along the track 272.

Like the pot follower assembly 80 of handling apparatus 10, pot follower assembly 280 includes a follower arm 282 and a cam follower 310 coupled to the arm. The follower arm 282, however, includes a fixed end 283 and movable end 285. The cam follower 310 is coupled to the follower arm 282 at a location intermediate the fixed and movable ends. The fixed end 283 is rotatably coupled to the follower mount 278 and the follower arm 282 is rotatable about its fixed end via the follower mount. The movable end 285 includes a pot engaging portion 288 that is insertable within the channel 222 defined by the pot guide 220.

The pot follower assembly 280 further includes a follower retractor assembly 300 that has a stationary member 302 and a movable member 304. The stationary member 302 includes an opening, or recess, 340 within which the movable member 304 is positioned. The movable member 304 is mounted to and pivotable about a pin coupled to the base and defining a pivot axis about which the movable member 304 pivots. The pivot axis is located intermediate an upper end 342 and a lower end 344 of the movable member 304. The retractor assembly 300 can include a biasing element (not shown), such as a helical spring, coupled to the movable member 304. In the view depicted in FIG. 10, the biasing element biases the movable member 304 to rotate about the pivot axis in a clockwise direction. The upper end 342 includes an upper tongue member 346 protruding from the upper end in a direction away from the guide 20. Similarly, the lower end 344 includes a lower tongue member 348 protruding from the lower end in a direction toward the guide. The upper and lower tongue members 346, 348 are biased by the biasing element into contact with the surfaces of the stationary member 302 defining the opening 340.

The retractor assembly 300 further includes a cam follower pathway defined between the surfaces defining the opening 340 and the movable member 304. The cam follower 279 is positioned within the pathway and follows the pathway as the carriage 274 moves along the linear track 272. As will be explained in more detail below, the position of the cam follower 276 relative to the pathway determines the position of the pot engaging portion 288 relative to the guide 120 and channel 122.

Figure 8:
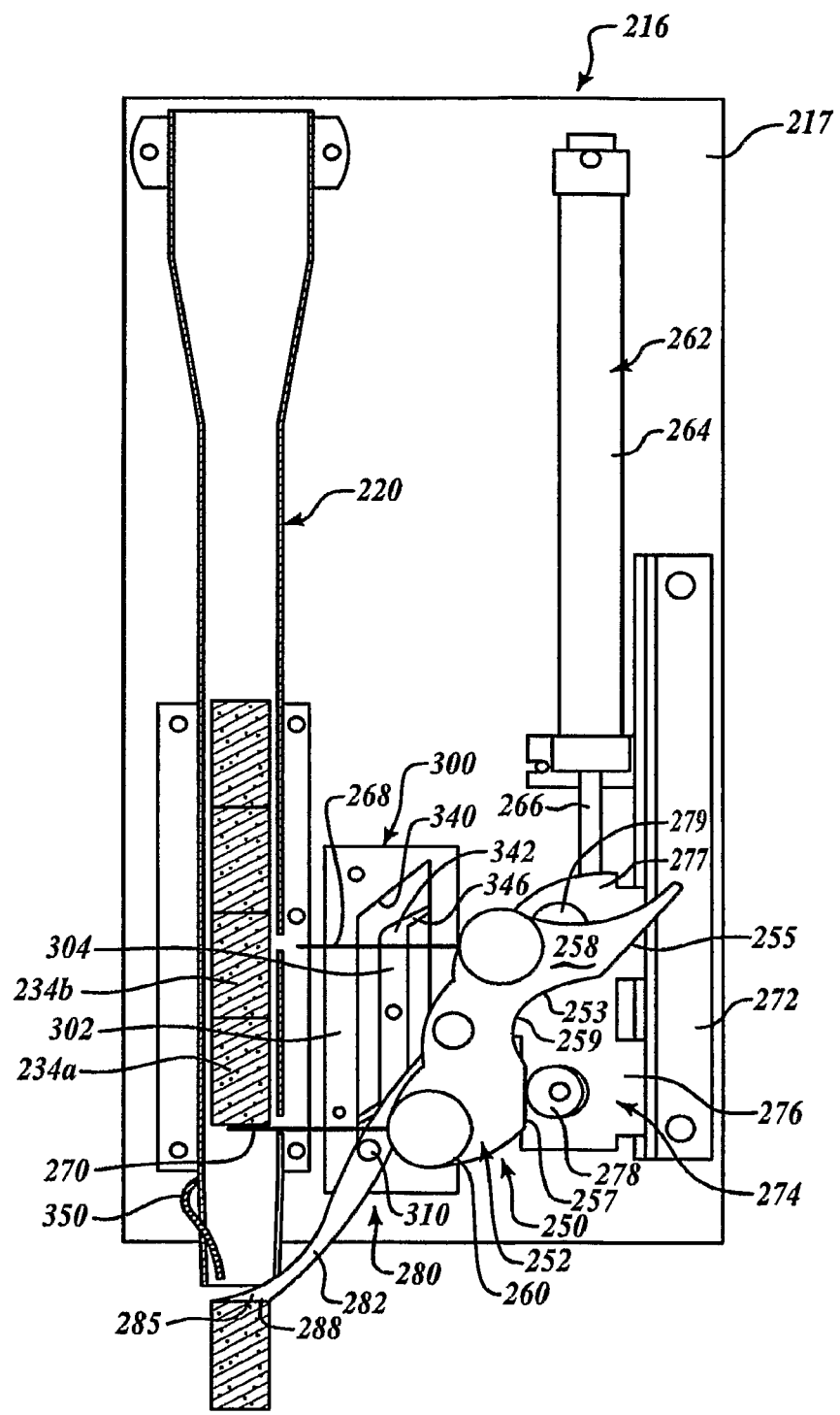
FIG. 8 is a front elevation view of a dispenser according to another embodiment shown with a regulator in a pot stopping position and a follower in a lowered position.

In operation, an iterative cycle can begin with the actuator 262 in an extended position to place the carriage 274 in a lowered position (see FIG. 8). With the carriage 274 in the lowered position, the cam follower 279 is adjacent the lower linear portion 255 of the regulator arm 252 and the regulator arm is in a pot stopping position. In the pot stopping position, the pot suspension member 268 is retracted from the channel 222, the pot stop member 270 is extended into the channel. In the pot stopping position, the pot stop member 270 prevents downward movement of a series of pots, e.g., pots 234A, 234B, within the channel 22. Further, with the carriage 274 in the lowered position, the pot engaging member 288 of the follower arm 282 is positioned in the channel 222 proximate a lower end 226 of the channel.

From the lowered position, the actuator 262 is operable to raise the carriage 274 along the linear track 272 in an upward stroke from the lowered position to a raised position as will be explained in more detail below. The dispenser 216 can include one or more sensors, such as reflecting light sensors 223 (see FIG. 3), mounted adjacent the channel 222 to detect the presence of one or more pots 234 in the channel. When the sensors detect the presence of pots in the channel at predetermined locations, the actuator 262 can be triggered to begin the upward stroke.

Figure 9:
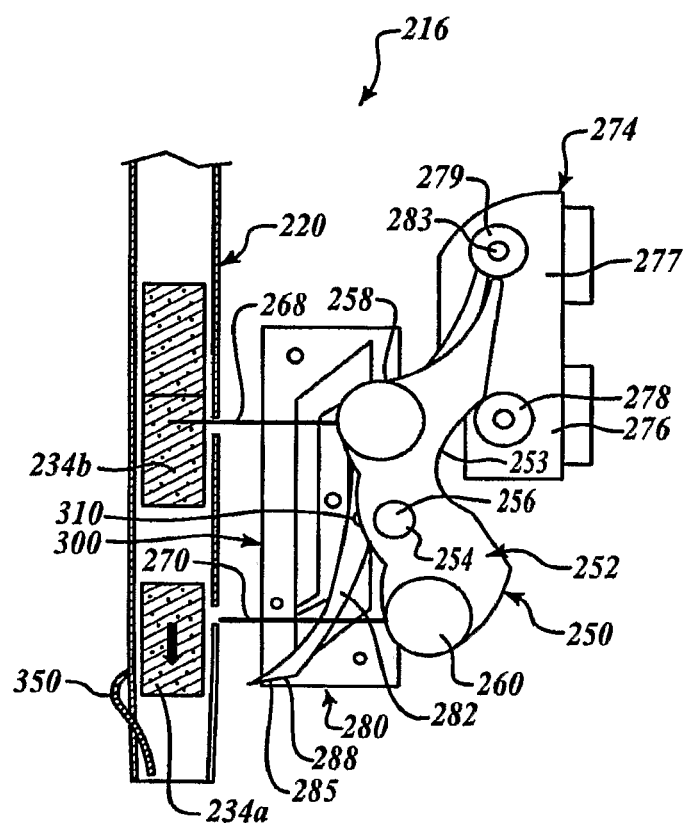
FIG. 9 is a front elevation view of the dispenser of FIG. 8 shown with the regulator in an intermediate position and the follower in an intermediate position.
Figure 10:
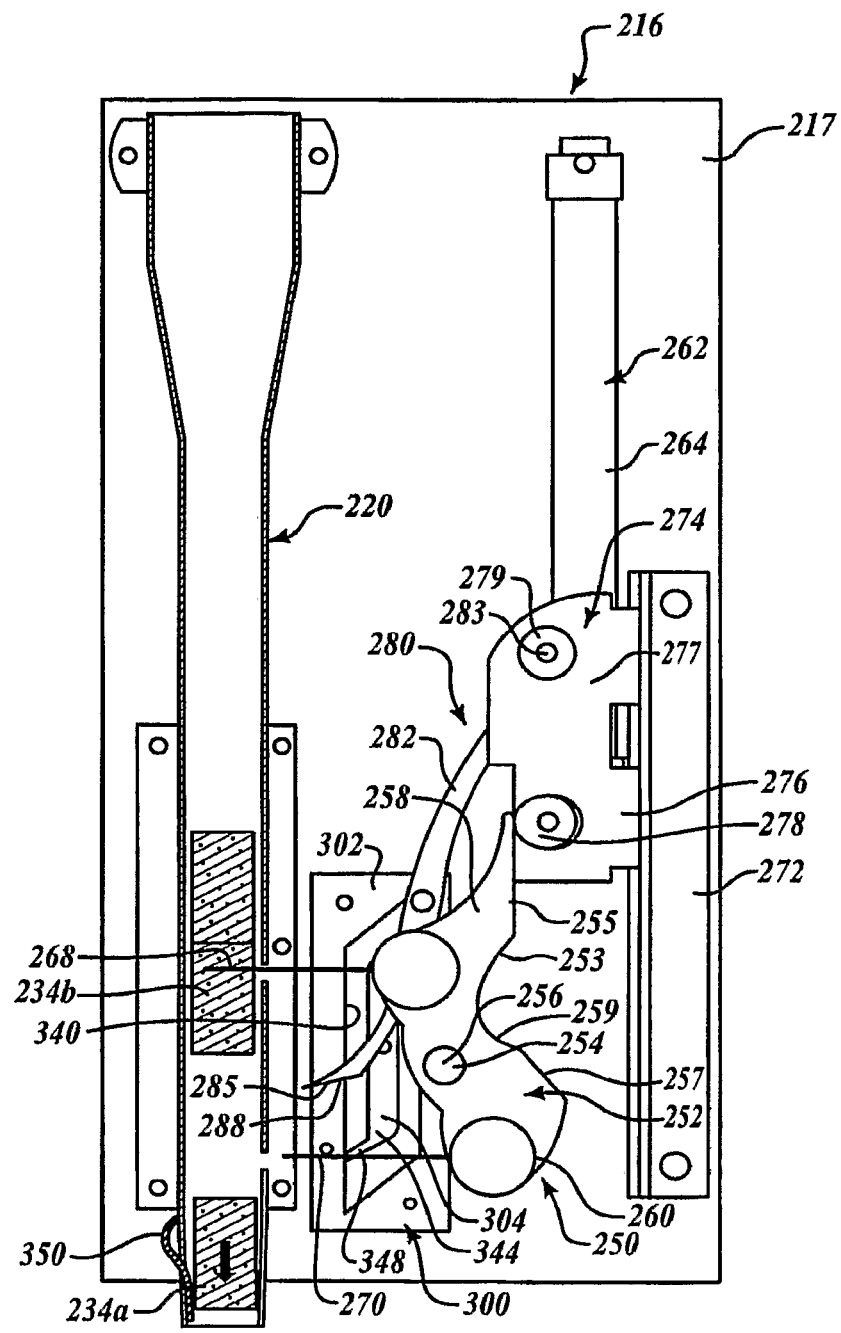
FIG. 10 is a front elevation view of the dispenser of FIG. 8 shown with the regulator in a pot penetrating position and the follower in the raised position.
Figure 11:
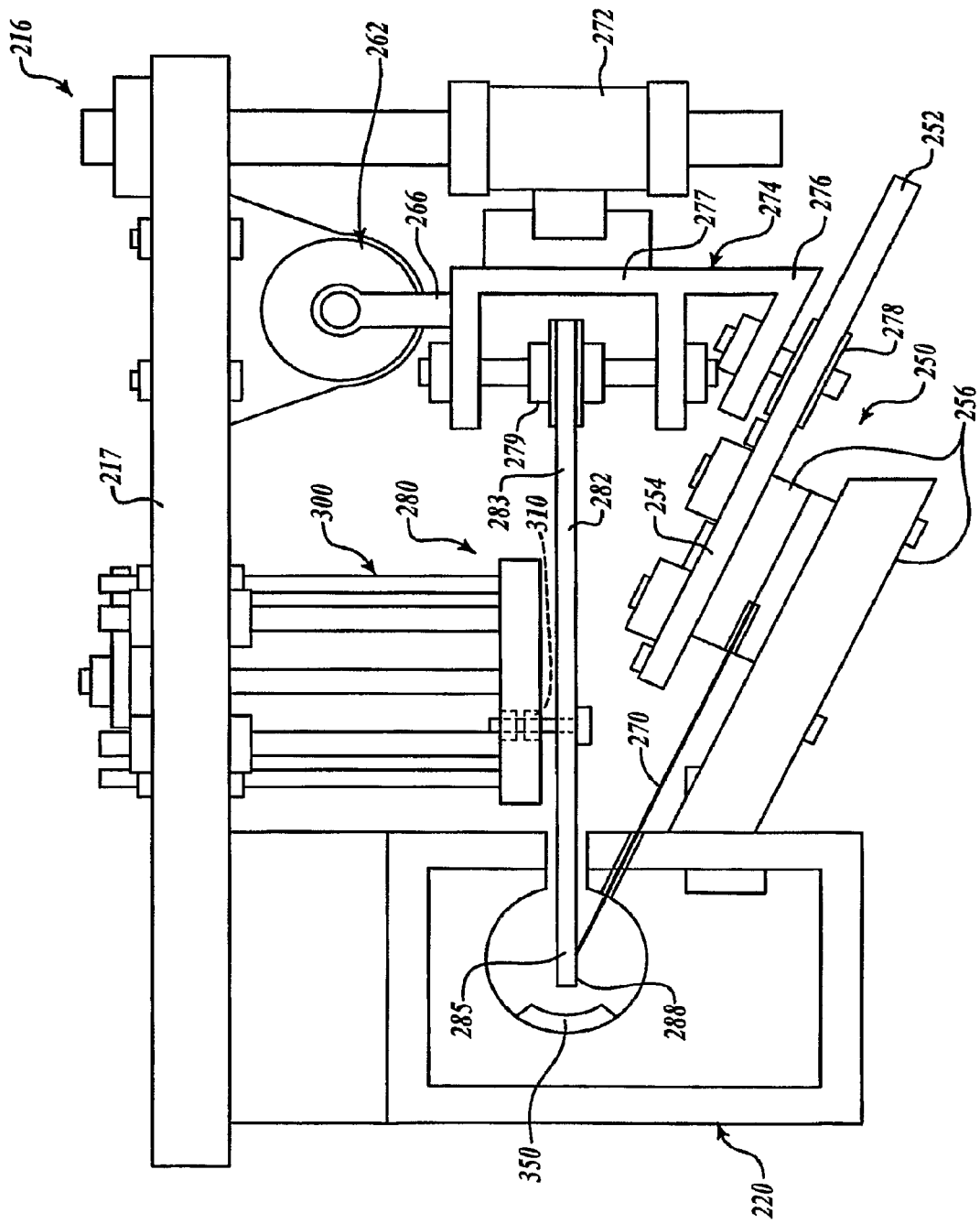
FIG. 11 is a top plan view of the dispenser of FIG. 8.

During the upward stroke, regulator arm 252 is kept in the pot stopping position as the cam follower 279 moves upwardly adjacent the lower linear portion 257 of the regulator arm 252 and passed a portion of the concave portion 259 (see FIG. 9). However, further upward movement of the carriage causes the regulator cam follower 279 to contact and move along the concave portion 259 to urge the regulator arm 252 to rotate out of the pot stopping position and into a pot penetrating position (see FIG. 10). In other words, the pot stop member 270 retracts out of the channel 222 to allow pot 234A to be gravity feed through the channel and the pot suspension member 268 extends into the channel to penetrate and suspend the next available pot, e.g., pot 234B. The pot 234A falls downwardly until it engages and is held in place by a friction gate 350, e.g., a spring biased lever. As the carriage moves upward to complete the upward stroke and place the carriage 274 in the raised position, the regulator arm 252 remains in the pot penetrating position.

During the upward stroke, the cam follower 310 raise to contact and move along the lower tongue member 346 away from the pot guide 20 (the upper tongue member acting as a one-way valved continuous pathway by preventing rotation of the movable member 304 in the clockwise direction). Such upward and outward movement of the cam follower 310 causes the pot engaging member 288 of the follower arm 282 to raise and retract from the channel 222. The cam follower 310 then moves upward along the cam follower path to raise the follower arm 82. Towards the end of the upward stroke, the cam follower 310 contacts the upper tongue element 346 to cause the movable member 104 to rotate counterclockwise as viewed in FIG. 10 and allow the cam follower 310 to continue its upward movement along the path. Accordingly, the movable member 104 is configured to operate as a one way valve, e.g., allowing movement in the counterclockwise direction, but restricting movement in the clockwise direction.

From the raised position, the actuator 262 is operable to lower the carriage 274 along the linear track 272 in a downward stroke from the raised position to the lowered position. During the downward stroke, regulator arm 252 is kept in the pot penetrating position as the cam follower 279 moves downwardly adjacent the upper linear portion 255 of the regulator arm 252 and passed the concave portion 259. However, further downward movement of the carriage causes the regulator cam follower 279 to contact and move along the lower linear portion 257 to urge the regulator arm 252 to rotate out of the pot penetrating position and back into the pot penetrating position. In other words, the pot suspension member 268 retracts out of the channel to allow pot 234B, and upwardly adjacent pots, to move downwardly within the channel 222, but the pot stop member 270 extends into the channel 222 to prevent further downward movement of the pot 234B and adjacent pots. As the carriage moves downward to complete the downward stroke and place the carriage 274 in the lowered position, the regulator arm 252 remains in the pot stopping position. In this manner, the regulator arm 252 reciprocates between the pot stopping position and the pot suspension position to facilitate separate and automated dispensing of pots from the guide 220.

During the downward stroke, the cam follower 310 lowers to contact and move along the upper tongue member 346 toward the pot guide 20 (the upper tongue member acting as a one-way valve to prevent upward movement of the cam follower in the clockwise direction as described above). Such downward and inward movement of the cam follower 310 causes the pot engaging member 288 of the follower arm 282 to lower and extend into the channel 222. The cam follower 310 then moves downward along the cam follower path to lower the pot engaging member 288 within the channel 222. The pot engaging member 288 engages a pot, such as pot 234B, stopped at the friction gate 350, or a pot stuck within the channel 222 above the friction gate, and accelerates and ejects it from the channel 222 through the lower end 226.

In certain embodiments, the actuators of the handling apparatus 10 are electrically coupled to a computing device (not shown) having a processor system. The processor system can include software installed thereon to numerically control the operation of the actuators for automatic positioning of the trays, positioning of the pot dispenser 16 and dispensing of pots 34 into trays. The software can be programmed to control the actuators based on one or more variables. For example, the actuators can be controlled differently based on the configuration, such as size, pattern, and number, of receptacles of the trays to be filled. As trays used in the horticultural industry typically follow industry standard specifications, the software can be programmed to accommodate one or more standardized or custom tray configurations.

Although the pot dispensers 16, 216 described herein include a single guide 20, 220 regulator 50, 250 and pot follower assembly 80, 280, respectively, to insert pots into receptacles one at a time, in other embodiments, the pot dispensers 16, 216 can include multiple guides, regulators and pot follower assemblies to insert multiple pots into multiple receptacles simultaneously. For example, one combination of guides, regulators and pot follower assemblies for each receptacle of row can be aligned in a side-by-side manner. The pots received from a pot-making apparatus can be distributed into the several guides through use of an interrupter device (not shown) similar to pot stop members 70, 270. The regulators and pot follower assemblies can be simultaneously operated to insert a pot into each receptacle of a given row.

In view of the many possible embodiments to which the principles of the disclosed handling apparatus may be applied, it should be recognized that the illustrated embodiments are only preferred examples of the apparatus and should not limit its scope. Rather, the scope of the invention is defined by the following claims. We therefore claim as our invention all that comes within the scope and spirit of these claims.

We claim:

1. An apparatus for automatically dispensing separated plant growth media articles, comprising:
   a media guide defining a continuous channel through which separated plant growth media articles are separately introducible, movable and dispensable; a media accelerator comprising a follower positionable within the channel, wherein the media accelerator is operable to move the follower through the channel and
   a media regulator comprising a media penetrating member positionable within the channel at a first location and a media stopping member positionable within the channel at a second location spaced-apart from the first location, wherein the media regulator is operable to alternate between a media stopping position in which the media stopping member is positioned within the channel to restrict a first media article and a following second media article from movement in at least a dispensing direction along the channel by abutting against an end surface of the first media article and a media penetrating position in which the media penetrating member is positioned within the channel to penetrate the second media article by piercing its side surface at a point between its first and second ends without severing the second media article.

2. The apparatus of claim 1, further comprising a single actuator coupleable to the media regulator and media accelerator to operate the media regulator and the media accelerator.

3. The apparatus of claim 1, wherein the follower is retractable from and extendable into the channel via engagement with a one-way valved continuous pathway.

4. The apparatus of claim 1, wherein the media regulator comprises a movable arm having a first upper portion and a second lower portion, the media penetrating member being coupled to the first upper portion and the media stopping member being coupled to the second lower portion, wherein the movable arm is pivotable about an axis positioned intermediate the first upper and second lower portions to extend and retract the media penetrating and stopping members respectively into and out from the channel as the media regulator alternates between the media stopping position and the media penetrating position.

5. The apparatus of claim 1, wherein in the media penetrating position, the media stopping member is retracted from the channel, and in the media stopping position, the media penetrating member is retracted from the channel.

6. The apparatus of claim 1, further comprising a carriage coupled to an actuator, wherein the carriage is movable along a track via operation of the actuator, and wherein the carriage comprises a cam follower engageable with the regulator to reciprocate the regulator between the media penetrating position and the media stopping position as the carriage moves along the track.

7. The apparatus of claim 1, further comprising a carriage coupled to an actuator, wherein the carriage is movable along a track via operation of the actuator, and wherein the carriage comprises (i) a cam follower engageable with the regulator to reciprocate the regulator between the media penetrating position and the media stopping position as the carriage moves along the track; and (ii) a follower coupling portion coupled to the follower to move the follower as the carriage moves along the track.

8. The apparatus of claim 1, wherein each of the separated plant growth media articles comprises degradable-material wrapped soil.

9. The apparatus of claim 1, wherein the media penetrating member and the media stopping member each comprise at least one needle.

10. The apparatus of claim 9, wherein the needle of the media penetrating member comprises a substance injector operable to inject a substance into the plant growth media.

11. The apparatus of claim 1, wherein the media penetrating member has a pointed end and is configured to move in a direction transverse to the channel to pierce the second plant growth media article after the first plant growth media article has been released from the media stopping position.

12. The apparatus of claim 11, wherein the media penetrating member is a needle, and wherein the channel comprises a transverse opening dimensioned to receive the needle as the media penetrating member is moved to the media penetrating position.

13. The apparatus of claim 1, wherein the channel is positioned at an angle to horizontal, and wherein the media stopping member in the media stopping position prevents media from sliding down the channel or dropping through the channel due to the action of gravity.

14. The apparatus of claim 1, wherein the continuous channel has a first end through which the separated plant growth media articles are introducible and an opposite second end through which each plant growth media article is individually dispensable.

15. The apparatus of claim 14, wherein the second end of the channel is positionable to distribute the plant growth media articles into trays.

16. The apparatus of claim 1, wherein the plant growth media articles comprise a paper wrapper defining an outer surface and a plant propagation material contained within the paper wrapper, and wherein the media penetrating member is configured to pierce the paper wrapper and only minimally contact the plant propagation material.

\* \* \* \* \*